United States Patent [19]
Ellerbroek et al.

[11] Patent Number: 5,128,530
[45] Date of Patent: Jul. 7, 1992

[54] PISTON ERROR ESTIMATION METHOD FOR SEGMENTED APERTURE OPTICAL SYSTEMS WHILE OBSERVING ARBITRARY UNKNOWN EXTENDED SCENES

[75] Inventors: Brent L. Ellerbroek, Albuquerque, N. Mex.; Gerard L. Rafanelli, Fountain Valley, Calif.

[73] Assignee: Hughes Aircraft Company, Los Angeles, Calif.

[21] Appl. No.: 706,458

[22] Filed: May 28, 1991

[51] Int. Cl.$^5$ .............................................. G01J 1/20
[52] U.S. Cl. .......................... 250/201.9; 356/121
[58] Field of Search ............... 250/201.9; 359/849, 359/853, 857; 356/121

[56] References Cited

U.S. PATENT DOCUMENTS

| | | | |
|---|---|---|---|
| 4,959,531 | 9/1990 | Marino | 250/201.9 |
| 4,990,762 | 2/1991 | Taylor | 250/201.9 |
| 5,072,104 | 12/1991 | Tatia | 250/201.9 |

Primary Examiner—David C. Nelms
Assistant Examiner—K. Shami
Attorney, Agent, or Firm—William J. Streeter; Georgann S. Grunebach; Wanda K. Denson-Low

[57] ABSTRACT

Relative piston misalignments between segments of a multisegment optical system, such as a segmented primary mirror, are reduced by a method in which elements of an arbitrary unknown extended scene image carried by an input beam are eliminated from the beam's error information in performing an error calculation. After appropriately processing the beam with the specialized sensor elements, spatial frequency domain representations of a variety of optical images are obtained which correspond to both individual segments, and to multiple combinations of segments of the optical system; each combination is preferably composed of two individual segments. The spatial frequency domain representations of the individual segments are then subtracted from the representations of the segment combinations to obtain spatial frequency domain functions for the combinations. These in turn are compared by a cross-coherence technique to derive spatial domain differences of piston differences misalignments between the combinations, from which the piston errors between individual segments can be calculated via a reconstruction matrix. The calculated piston errors are then used to make a compensating adjustment to the piston positions of the individual segments in the optical processing element.

29 Claims, 3 Drawing Sheets

PISTON ERROR ESTIMATION METHOD FOR SEGMENTED APERTURE OPTICAL SYSTEMS WHILE OBSERVING ARBITRARY UNKNOWN EXTENDED SCENES

BACKGROUND OF THE INVENTION

1. Field of the Invention

This invention relates to the alignment and control of segmented aperture optical systems, and more particularly to methods for estimating errors associated with piston misalignments between the various elements of the segmented optical surfaces.

2. Description of the Related Art

A wide variety of proposed large aperture, imaging optical systems presently under discussion may utilize segmented optics technology in order to reduce optics fabrication costs. Such systems will require active sensing and control of segment alignment errors if they are to achieve diffraction-limited levels of image quality. Although a variety of metrology concepts are under development and appear well suited for the direct measurement of segment tilt and piston errors, alignment estimation concepts based directly upon optical system image quality remain of interest to reduce the calibration accuracy and long-term stability required of local sensing techniques. This invention is a new scene-based alignment sensing technique with several significant advantages over existing approaches.

To successfully provide high resolution imagery from distant extended scenes, relatively large aperture optical systems are required. The aperture diameters may be on the order of several meters. In order to reduce fabrication costs, as well as provide a means to package large optical systems into current space launch vehicles, the optical elements, such as mirrors, are fabricated as a number of segmented components. If the segments are perfectly aligned with each other the total prescribed overall mirror surface is formed.

Ideally, all of the mirror segments should lie in a surface that satisfies the mirror prescription. Each mirror segment is provided with actuators that are capable of controlling the piston degrees of freedom by moving the segment forward or backward to align it with adjacent segments. Misalignments in which one segment is either too far forward or too far back with respect to the other segments are referred to as "piston errors".

Large optical systems employing segmented optics require active sensing and control of piston errors to achieve diffraction limited image quality. While various approaches have been taken in the past to detect and correct piston errors, many do not involve direct full segment measurement of the optical system's performance, require optical element "dithering", or are highly sensitive to noise.

The basic problem in determining segment to segment piston errors while observing incoherent extended scenes is the necessity to develop a measurement and processing procedure that separates the scene effects from the optical system's wavefront errors. One prior approach involves the active measurement of piston errors between individual segments by electro-mechanical measurement of the back surface distance variation between segments. This approach suffers from being only an indirect measurement of segment errors. Since the entire front surfaces of the segments (not the rear surfaces) provide the critical figure, electro-mechanical devices are subject to a variety of bias error sources.

Another approach that has been quite common is the "multi-dither" technique, in which multiple images are recorded both before and after one or more adjustments ("dithers") to the various segments locations. The actual changes in the images resulting from the dithers are used to calculate the degree of piston errors present. In order to provide a sufficient number of independent measurements needed to effectively estimate the number of piston degrees of freedom, at least one such adjustment or dither is required for each alignment degree of freedom to be estimated. The implementation of "dithering" can produce complex opto-mechanical arrangements, increase the power and bandwidth required of the segment alignment actuators, and may cause a time averaged degradation of image quality. Such a multi-dither technique is described in R. A. Muller and A. Buffington, J.O.S.A., Vol. 64, #4, 1974, page 1200, and B. L. Ellerbroek, *The Optical Science Corporation*, Report No. Tr. 645,650, 1985. Because of multi-dither techniques' impact on opto-mechanical complexity, actuator power and bandwidth requirements, as well as sensitivity to noise, the application of these techniques to optical systems with many segments is questionable.

A different approach involves the employment of error sensing devices that are placed directly on the optical surface to be controlled. These include devices such as buried gratings, corner cubes and holographic optical elements. These devices are positioned to reflect light back to a focal plane sensor, with the location of the reflected spot providing information on the relative piston error for the segment from which it was reflected. This approach suffers from limitations similar to the active electro-mechanical measurement technique, discussed above. In particular, surface error sensing devices require complex fabrication techniques, and do not sample the entire surface to be controlled.

SUMMARY OF THE INVENTION

The present invention, referred to as the cross-coherence piston sensor (or C²PS), is capable of determining relative piston errors while observing unknown extended scenes. This piston error sensing technique provides full aperture sensing with a linear dynamic range of $\pm\lambda/2$, where $\lambda$ is the mean wavelength of the observed photons. In addition, the C²PS provides piston estimates without piston adjustments in the optical train, ("ditherless" operation).

The present invention provides an accurate method of determining piston errors in a multi-segment optical system by a direct measurement of the system's optical performance. Its physical implementation is considerably more simple than the electro-mechanical and segment sharing elements discussed above, while it does not require the increased actuator and detection power and bandwidth of the multi-dither techniques. In addition, it is also applicable to systems with large numbers of segments.

FIG. 1 illustrates one possible realization of the sensor package and estimation algorithms which comprise the new scene-based segment alignment sensing concept. The figure corresponds to a sample segmented aperture geometry consisting of a 3 by 3 segment configuration with a central obscuration, thereby having 8 controlled segments. Radiation from the scene enters the sensor package at the left and is subdivided into three separate beams by beamsplitters. The three beampaths contain lenslet arrays which are conjugate to the optical system's segmented mirror. Some of the lenslets correspond to individual mirror segments; the remaining subapertures map onto contiguous segment pairs. Three focal plane arrays are used to record scene images through the various lenslets. Differential segment tilts are measured by comparison of the scene images recorded through the individual segment lenslets. Differences of segment piston errors are simultaneously estimated via spatial frequency domain comparison of the bisegment scenes. Finally, the global segment tilt and piston alignment errors are reconstructed from these differential measurements using a linear least squares estimation algorithm.

As with other scene-based piston estimation concepts, the present concept provides the advantages of i) full-segment piston measurement (as opposed to edge piston sensing), and ii) reduced reliance upon the long-term accuracy of metrology systems. Just as importantly, the sensing technique considered here eliminates several complications associated with previous scene-based approaches. Segment piston errors may be estimated from images of unknown, extended scenes without a requirement for small piston alignment adjustments or "dithers". In the absence of implementation error sources, the piston error estimate obtained by the algorithm is exact up to $n\lambda$ ambiguities. Both of these features represent significant improvements over all prior approaches (with which we are familiar), and greatly increase the concept's applicability to segmented mirrors with large numbers of segments. Because of the $n\lambda$ ambiguity issue, alternate algorithms requiring alignment dithers will still be necessary for the initial capture of large segment piston errors immediately after system deployment.

These and other features and advantages of the invention will be apparent to those skilled in the art from the following detailed description, taken together with the accompanying drawings, in which:

DETAILED DESCRIPTION OF THE INVENTION

Figure 1:
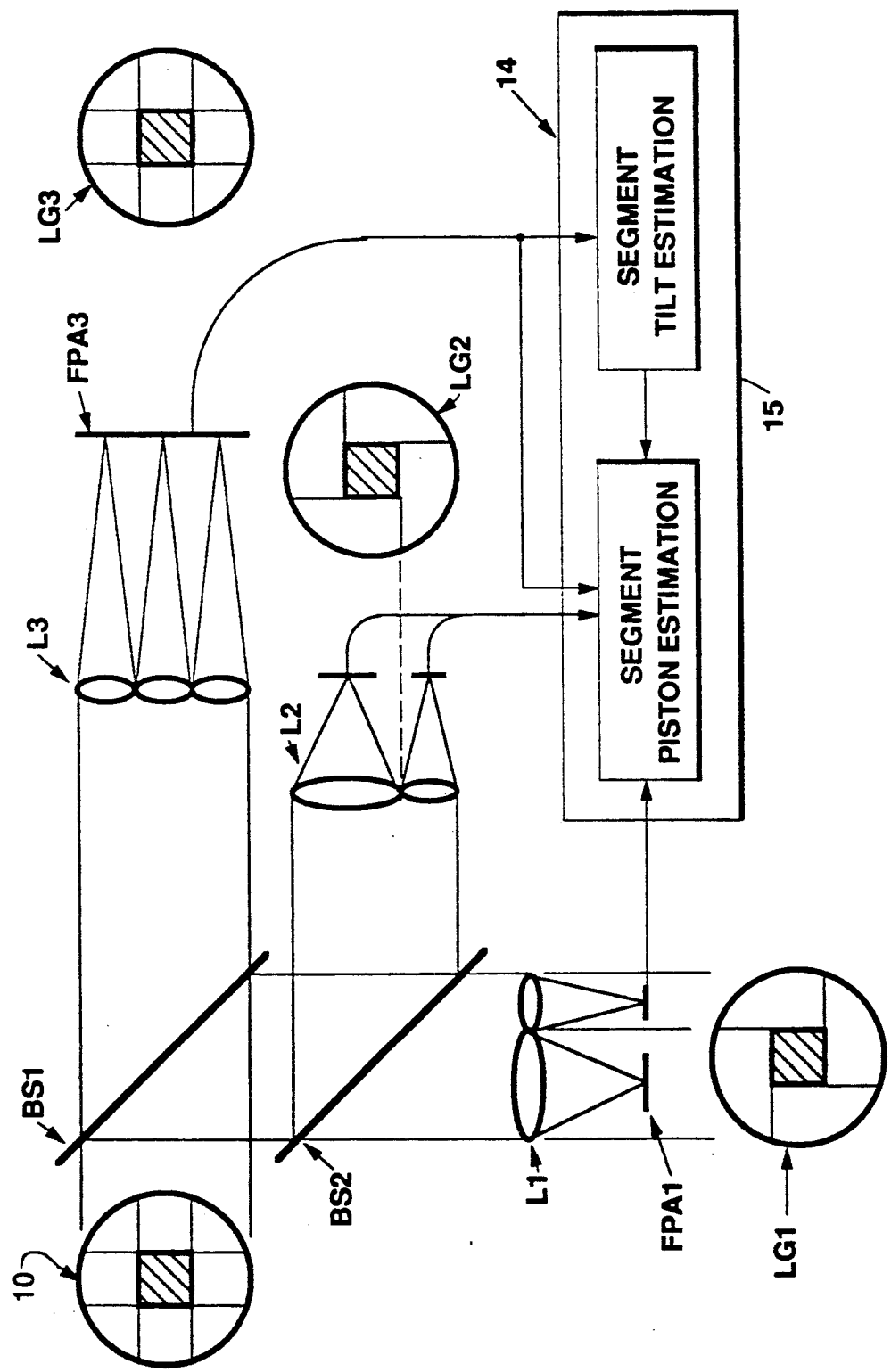
FIG. 1 is a block diagram of the invention's scene based segment piston and tilt error sensing concept.

The cross-coherence piston sensor estimates the tilt and piston alignment errors of segmented optical systems by comparing multiple images of the same scene recorded through several different subapertures. FIG. 1 illustrates a possible subaperture pattern for a segmented aperture of eight segments arranged in a 3 by 3 array with a central obscuration. Eight subapertures image the scene through individual mirror segments; frequency domain analysis of these eight images results in an estimate of segment tilt errors. Eight additional subapertures image the scene through pairs of adjacent segments, and these measurements are used for segment piston error estimation. The image comparison techniques used for both tilt and piston estimation are essentially cross-coherence and cross-correlation techniques which determine phase differences between the Fourier transforms of images recorded through different subapertures.

THE INVENTION'S PROCESSING ALGORITHMS AND MOTIVATION

I. Piston-Only Estimation

The single-segment scene images used by the cross-coherence piston sensors algorithm will be denoted by the function $I_i$, where i is the number of the mirror segment. The two-segment scene image recorded through segments number i and j will be written as $I_{ij}$. These images will be modelled by the formulas $$I_i = S \oplus D \oplus B_i \qquad (1)$$

$$I_{ij} = S \oplus D \oplus B_{ij} \qquad (2)$$

where S is the first-order geometric image of the scene on the focal plane, D is the responsivity function of an individual FPA detector, and $B_i$ and $B_{ij}$ are the point spread functions associated with segment number i and segments number i and j. The $\oplus$ indicates the convolution operation. The scene spectra used as the direct input to the cross coherence piston sensor's algorithm are then given by the expressions $$\hat{I}_i = \hat{S}\,\hat{D}\,\hat{B}_i \qquad (3)$$

$$\hat{I}_{ij} = \hat{S}\,\hat{D}\,\hat{B}_{ij} \qquad (4)$$

where $\hat{S}$ is the Fourier transform of a function S. The impact of segment phasing and tilt errors upon system optical performance is given by the optical transfer $\hat{B}$ and $\hat{B}_{ij}$. When no segment tilt errors are present, these functions are described by $$\hat{B}_i(\vec{\kappa}) = (U_i * U_i)(R\lambda\vec{\kappa}) \qquad (5)$$

$$\hat{B}_{ij}(\vec{\kappa}) = [(e^{i\phi_i}U_i + e^{i\phi_j}U_j)^*(e^{i\phi_i}U_i + e^{i\phi_j}U_j)](R\lambda\vec{\kappa}) \qquad (6)$$

where $U_i$ is the $\{0,1\}$-valued clear aperture function for segment number i, $\phi_i$ is the phasing error for that segment, $\lambda$ is the sensing wavelength, and R is the sensor's focal length. The autocorrelation operator * is defined by the formula $$(f*g)(\vec{r}) = \int d\vec{s}\, f(\vec{s}) g^*(\vec{s} - \vec{r}) \qquad (7).$$

The goal of the cross-coherence piston sensor's algorithm is to estimate the segment phase errors $\phi_i$ from the scene spectra $\hat{I}_i$ and $\hat{I}_{ij}$, even when the scene S is entirely unknown.

A brief digression is necessary at this point to highlight the inner working of the cross-coherence piston sensing algorithm. Substituting Eq. 7 into Eq.'s 5 and 6 and rearranging slightly gives the result $$\hat{B}_{ij}(\vec{\kappa}) - \hat{B}_i(\vec{\kappa}) - \hat{B}_j(\vec{\kappa}) = e^{i(\phi_j - \phi_i)} \int d\vec{s}\, U_i(\vec{s}) U_j(\vec{s} - R\lambda\vec{\kappa}) + e^{i(\phi_i - \phi_j)} \int d\vec{s}\, U_j(\vec{s}) U_i(\vec{s} - R\lambda\vec{\kappa}) \qquad (8)$$
$$= e^{i(\phi_i - \phi_j)}(U_i * U_j)(R\lambda\vec{\kappa}) + e^{i(\phi_j - \phi_i)}(U_j * U_i)(R\lambda\vec{\kappa}).$$

The functions $U_i * U_j$ and $U_j * U_i$ are nonzero on disjoint regions as long as the segments $U_i$ and $U_j$ are convex. It follows that the function $\chi_{ij}$ defined by the formula $$\chi_{ij}(\vec{\kappa}) = \begin{cases} 1 & \text{if } (U_i^* U_j)(R\lambda\vec{\kappa}) \neq 0, \\ 0 & \text{otherwise} \end{cases} \quad (9)$$

satisfies the relationship $$\chi_{ij}(\vec{\kappa})(U_j^* U_i)(R\lambda\vec{\kappa}) \equiv 0. \quad (10)$$

Eq.'s 8 and 10 together give the result $$\chi_{ij}(\vec{\kappa})[\hat{B}_{ij}(\vec{\kappa}) - \hat{B}_i(\vec{\kappa}) - \hat{B}_j(\vec{\kappa})] = e^{i(\phi_i - \phi_j)}(U_i^* U_j)(R\lambda\vec{\kappa}) \quad (11)$$

Figure 2:
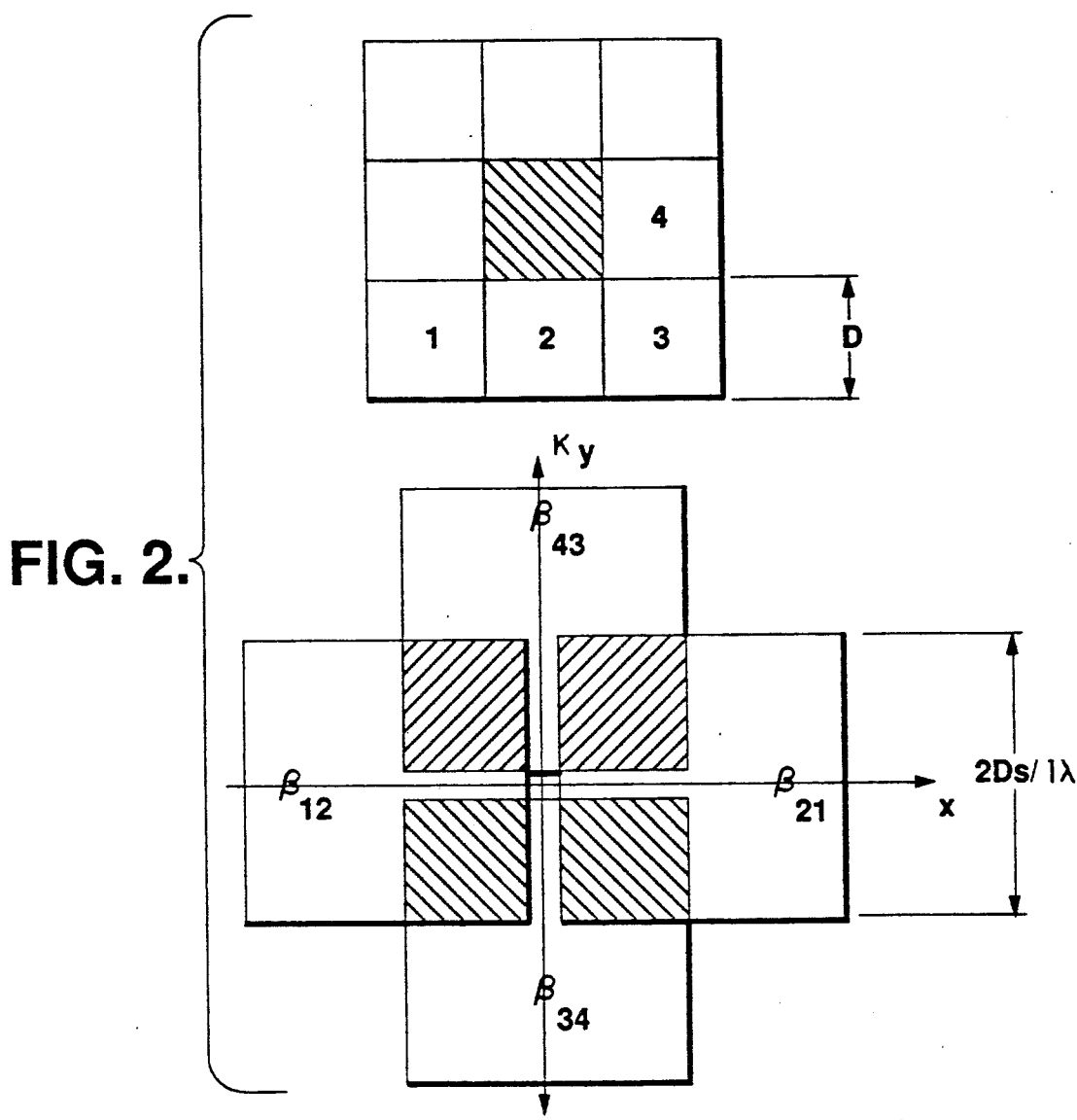
FIG. 2 is a conceptual illustration of the piston estimation passband filters used in the invention.

Since $U_i^* U_j$ is a real function (in the special case of no segment tilt errors), the phase of the function of $\vec{\kappa}$ given by Eq. 11 is determined entirely by the segment piston difference $\phi_i - \phi_j$. FIG. 2 illustrates the function $\chi_{ij}$ for the segment aperture geometry given in FIG. 1, but with square subapertures for illustration purposes.

Eq. 11 is the key to the cross-coherence piston sensor's algorithm. The first step of the algorithm is given by the formula $$\phi_{ij,kl} = \arg\{\int d\vec{\kappa}[\chi_{ij}(\hat{I}_{ij} - \hat{I}_i - \hat{I}_j)][\chi_{kl}(\hat{I}_{kl} - \hat{I}_k - \hat{I}_l)]^*\} \quad (12)$$

where arg(z) is the phase of a complex number z and the superscript * refers to the process of complex conjugation. The quantity $\phi_{ij,kl}$ is a linear combination of segment piston errors. To see this, note that Eq.s 3 and 4 give the result $$\phi_{ij,kl} = \arg\{\int d\vec{\kappa}|\hat{S}|^2|\hat{D}|^2[\chi_{ij}(\hat{B}_{ij} - \hat{B}_i - \hat{B}_j)][\chi_{kl}(\hat{B}_{kl} - \hat{B}_k - \hat{B}_l)]^*\}. \quad (13)$$

Using Eq. 11 this becomes $$\phi_{ij,kl} = \arg\{e^{i(\phi_i - \phi_j - \phi_k + \phi_l)}\int d\vec{\kappa}|\hat{S}|^2|\hat{D}|^2(U_i^* U_j)(R\lambda\vec{\kappa})(U_k^* U_l)(R\lambda\vec{\kappa})\}. \quad (14)$$

The integrand appearing in Eq. 14 is real in the absence of segment tilt errors. Consequently, $$\phi_{ij,kl} = \phi_i - \phi_j - \phi_k + \phi_l. \quad (15)$$

The cross-coherence piston sensor's algorithm computes this linear combination of segment piston errors using Eq. 12 for various i, j, k, and l according to the aperture segment geometry and the number of images $I_{ij}$ recorded by the cross-coherence piston sensor. Segment piston errors are then estimated from these linear combinations using a linear estimation algorithm very analogous to conventional wavefront reconstruction. This estimation algorithm is selected to minimize the effect of sensor measurement noise on piston estimation accuracy.

II. Effect of Segment Tilt Errors

Figure 3:
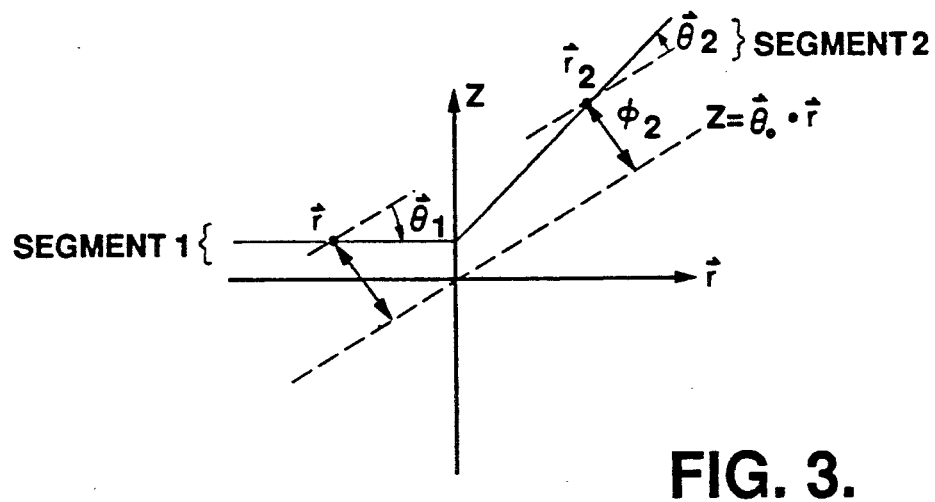
FIG. 3 is a plot showing the tilt-piston coupling nomenclature and geometry.

Segment piston errors may be defined relative to several different planes of reference when segment tilt errors are also present. The convention used in this section is illustrated in FIG. 3. The angle $\vec{\theta}_o$ is the average tilt of the segments comprising the aperture, and $\vec{\theta}_i$ is the difference between the tilt on segment number i and this average value. The pivot point about which segment number i tilts has coordinates $\vec{r}_i$ in the aperture plane. Finally, the piston error $\phi_i$ associated with segment number i is measured at the pivot point $\vec{r}_i$ relative to a reference plane at angle $\vec{\theta}_o$. Measuring and compensating the errors $\phi_i$ and $\vec{\theta}_i$ defined as above will align the aperture segments in the plane given by the equation $z = \vec{\theta}_o \cdot \vec{r}$. It is of course not possible to determine the average segment tilt angle $\vec{\theta}_o$ using only data from a single unknown, extended scene.

This subsection will describe the impact of the tilt error $\vec{\theta}_o$ and $\vec{\theta}_i$ upon the accuracy of the cross-coherence piston error estimation algorithm described in the previous subsection. Analytically, the inclusion of these tilt errors corresponds to replacing the segment clear aperture functions $U_i$ by the generalized pupil function $\tilde{U}_i$ defined by the formula $$\tilde{U}_i(\vec{r}) = U_i(\vec{r})\exp\{ik[\vec{\theta}_o \cdot \vec{r} + \vec{\theta}_i \cdot (\vec{r} - \vec{r}_i)]\}. \quad (16)$$

The formulas for the subaperture OTFs $\hat{B}_i$ and $\hat{B}_j$ now become $$\hat{B}_i(\vec{\kappa}) = (\tilde{U}_i^* \tilde{U}_i)(R\lambda\vec{\kappa}) \quad (17)$$

$$\hat{B}_{ij}(\vec{\kappa}) = [(e^{i\phi_i}\tilde{U}_i + e^{i\phi_j}\tilde{U}_j)^*(e^{i\phi_i}\tilde{U}_i + e^{i\phi_j}\tilde{U}_j)](R\lambda\vec{\kappa}). \quad (18)$$

The analysis will be restricted to the special case where the segments $U_i$ share a common, symmetric shape $U_o$, i.e., $$U_i(\vec{r}) = U_o(\vec{r} - \vec{s}_i) \quad (19)$$

$$U_o(\vec{r}) = U_o(-\vec{r}) \quad (20)$$

where $\vec{s}_i$ is the centroid of segment number i. The sharing of a common segment shape is not a requirement for the generalized operation of the cross-coherence piston sensor.

Because the support of the functions $\tilde{U}_i$ is the same as for $U_i$, the relationship $$\chi_{ij}(\vec{\kappa})(\tilde{U}_j^* \tilde{U}_i)(R\lambda\vec{\kappa}) \equiv 0 \quad (21)$$

is still valid. It follows that the tilt-free Eq. 11 now becomes $$\chi_{ij}(\vec{\kappa})[\hat{B}_{ij}(\vec{\kappa}) - \hat{B}_i(\vec{\kappa}) - \hat{B}_j(\vec{\kappa})] = e^{i(\phi_i - \phi_j)}(\tilde{U}_i^* \tilde{U}_j)(R\lambda\vec{\kappa}). \quad (22)$$

The function $\tilde{U}_i^* \tilde{U}_j$ is no longer real, but now has a nonzero phase value which will contribute as bias on top of the desired piston difference value $\phi_i - \phi_j$. Using Eq. 7, the value of the function $\tilde{U}_i^* \tilde{U}_j$ is given explicitly by the formula $$(\tilde{U}_i^* \tilde{U}_j)(R\lambda\vec{\kappa}) = \int d\vec{r} U_i(\vec{r})\exp\{ik[\vec{\theta}_o \cdot \vec{r} + \vec{\theta}_i \cdot (\vec{r} - \vec{r}_i)]\} U_j(\vec{r} - R\lambda\vec{\kappa}) \times \exp\{ik[\vec{\theta}_o \cdot (\vec{r} - R\lambda\vec{\kappa}) + \vec{\theta}_j \cdot (\vec{r} - R\lambda\vec{\kappa} - \vec{r}_j)]\}. \quad (23)$$

To evaluate the phase associated with this function, we begin with the change of variable $$\vec{\delta} = \vec{r} - \frac{R\lambda\vec{\kappa}}{2} - \frac{\vec{s}_i + \vec{s}_j}{2} \quad (24)$$

Rearranging slightly, Eq. 23 now becomes $$(\tilde{U}_i^* \tilde{U}_j)(R\lambda\vec{\kappa}) = \quad (25)$$

$$\exp[ik\vec{\theta}_o \cdot (R\lambda\vec{\kappa})]\int d\vec{\delta} U_i\left(\vec{\delta} + \frac{R\lambda\vec{\kappa}}{2} + \frac{\vec{s}_i + \vec{s}_j}{2}\right) \times$$

$$U_j\left(\vec{\delta} - \frac{R\lambda\vec{\kappa}}{2} + \frac{\vec{s}_i + \vec{s}_j}{2}\right) \times$$

-continued $$\exp\left\{ik\left[\vec{\theta_i}\cdot\left(\vec{\delta}+\frac{R\lambda\vec{\kappa}}{2}+\frac{\vec{s_i}+\vec{s_j}}{2}-\vec{r_i}\right)+\right.\right.$$

$$\left.\left.-\vec{\theta_j}\cdot\left(\vec{\delta}-\frac{R\lambda\vec{\kappa}}{2}+\frac{\vec{s_i}+\vec{s_j}}{2}-\vec{r_j}\right)\right]\right\}.$$

Substituting Eq. 19 for the functions $U_i$ and $U_j$ and factoring terms independent of $\vec{\delta}$ outside of the integral yields the result $$(\tilde{U}_i^*\tilde{U}_j)(R\lambda\vec{\kappa}) = \quad (26)$$

$$\exp[ik\vec{\theta_o}\cdot(R\lambda\vec{\kappa})]\exp\left\{ik\left[\vec{\theta_i}\cdot\left(\frac{R\lambda\vec{\kappa}}{2}+\frac{\vec{s_i}+\vec{s_j}}{2}-\vec{r_i}\right)+\right.\right.$$

$$\left.\left.\vec{\theta_j}\cdot\left(\frac{R\lambda\vec{\kappa}}{2}-\frac{\vec{s_i}+\vec{s_j}}{2}+\vec{r_j}\right)\right]\right\}\times$$

$$\int d\vec{\delta} U_o\left(\vec{\delta}+\frac{R\lambda\vec{\kappa}}{2}+\frac{\vec{s_j}-\vec{s_i}}{2}\right)\times$$

$$U_o\left(\vec{\delta}-\frac{R\lambda\vec{\kappa}}{2}-\frac{\vec{s_j}-\vec{s_i}}{2}\right)\times \exp[ik(\vec{\theta_i}-\vec{\theta_j})\cdot\vec{\delta}]$$

Because of Eq. 20, the integrand appearing above is conjugate symmetric. The value of the integral is therefore real, and the phase of the function $\tilde{U}_i^*\tilde{U}_j$ is just the phase of the complex exponential appearing on the righthand side of Eq. 26.

For later applications, it will be convenient to abbreviate Eq. 26 in the form $$(\tilde{U}_i^*\tilde{U}_j)(R\lambda\vec{\kappa})=\exp[ik\vec{\theta_o}\cdot(R\lambda\vec{\kappa})]\exp\{ik[\vec{\theta_i}\vec{f_i}$$
$$(\vec{\kappa})+\vec{\theta_j}\vec{f_j}(\vec{\kappa})]\}\tilde{U}_{ij} \quad (27)$$

where the functions $\vec{f}_i$, $\vec{f}_j$ and $U_{ij}$ are defined by the equations $$\vec{f_i}(\vec{\kappa}) = \frac{R\lambda\vec{\kappa}}{2}+\frac{\vec{s_i}+\vec{s_j}}{2}-\vec{r_i} \quad (28)$$

$$\vec{f_j}(\vec{\kappa}) = \frac{R\lambda\vec{\kappa}}{2}-\frac{\vec{s_i}+\vec{s_j}}{2}+\vec{r_j} \quad (29)$$

$$U_{ij} = \quad (30)$$

$$\int d\vec{\delta} U_o\left(\vec{\delta}+\frac{R\lambda\vec{\kappa}}{2}+\frac{\vec{s_j}-\vec{s_i}}{2}\right)U_o\left(\vec{\delta}-\frac{R\lambda\vec{\kappa}}{2}-\frac{\vec{s_j}-\vec{s_i}}{2}\right)\times$$

$$\exp[ik(\vec{\theta_i}-\vec{\theta_j})\vec{\delta}].$$

It is also useful to note that the single segment OTF, $\hat{B}_i$, is described by the formula $$\hat{B}_i(\vec{\kappa}) = \exp[ik(\vec{\theta_o}+\vec{\theta_i})\cdot(R\lambda\vec{\kappa})]\int d\vec{r} U_i(\vec{r})U_i(\vec{r}-R\lambda\vec{\kappa}) \quad (31)$$
$$= \exp[ik(\theta_o+\theta_i)\cdot(R\lambda\vec{\kappa})](U_i^*U_i)(R\lambda\vec{\kappa}),$$

when segment tilt errors are present.

Piston and Tilt Estimation

Two modifications can be made to the tilt-free cross-coherence piston sensor's algorithm to enhance its performance in the presence of segment tilt errors. The first change is to estimate segment-to-segment tilt differences using the single-segment scene image spectra $\hat{I}_i$. Secondly, these tilt estimates are then used to compensate for the cross-coupling of tilts into segment piston error sensing.

The algorithm used to estimate tilt errors from the image spectra $\hat{I}_i$ is straightforward. For Eq.s 3 and 31, it follows that the product $\hat{I}_k\hat{I}_j^*$ satisfies the expression $$\hat{I}_i\hat{I}_j^* = |\hat{S}|^2|\hat{D}|^2\exp[ik(\vec{\theta_i}-\vec{\theta_j})\cdot(R\lambda\vec{\kappa})](U_i^*$$
$$U_i)(R\lambda\vec{\kappa})(U_j^*U_j)(R\lambda\vec{\kappa}). \quad (32)$$

All terms on the right-hand side of this formula are real and positive except for the complex exponential. The segment tilt difference $\vec{\theta_i}-\vec{\theta_j}$ can consequently be determined as the angle $\vec{\Psi}^*$ maximizing the function $P_{ij}(\vec{\Psi}^*)$, defined by the formula $$P_{ij}(\vec{\Psi}^*) = \int d\vec{\kappa}\hat{I}_i\hat{I}_j^*\exp[-ik\vec{\Psi}\cdot(R\lambda\vec{\kappa})]. \quad (33)$$

After estimating the differences $\vec{\theta_i}-\vec{\theta_j}$ for different values of i and j, the segment tilts $\vec{\theta_i}$ themselves may be determined using a linear, least-squares estimation algorithm.

The error estimates obtained as above can of course be used to generate actuator commands nulling the tilt errors. A second possible application is to compensate for the effect of segment tilt errors on piston sensing. This effect is obtained by replacing Eq. 12 of the cross-coherence piston sensor's algorithm by the formula $$\phi_{ij,kl}=\arg\{\int d\vec{\kappa}\chi_{ij}\exp[-ik(\vec{\theta_i}\vec{f_i}+\vec{\theta_j}\vec{f_j})](\hat{I}_{ij}-\hat{I}_i-\hat{I}_j)\times\chi_{kl}\exp[-ik(\vec{\theta_k}\vec{f_k}+\vec{\theta_l}\vec{f_l})](\hat{I}_{kl}-\hat{I}_k-\hat{I}_l)^*\}, \quad (34)$$

where the functions $\hat{I}_i$ and $\hat{I}_j$ are defined by Eq.s 28 and 29. This modification completely compensates for segment tilt errors in the special case where all mirror segments are symmetric and identical. Using Eq.s 3, 4 and 22, the new formula for $\phi_{ij,kl}$ becomes $$\phi_{ij,kl} = \arg\{e^{i(\theta_i-\theta_j-\theta_k+\theta_l)}\int d\vec{\kappa}|\hat{S}|^2|\hat{D}|^2\times \quad (35)$$

$$\exp[-ik(\vec{\theta_i}\cdot\vec{f_i}+\vec{\theta_j}\cdot\vec{f_j}-\vec{\theta_k}\cdot\vec{f_k}-\vec{\theta_l}\cdot\vec{f_l}]\times$$

$$(\tilde{U}_i^*\tilde{U}_j)(R\lambda\vec{\kappa})(\tilde{U}_k^*\tilde{U}_l)^*(R\lambda\vec{\kappa})\}.$$

Using Eq. 27, this simplifies to the form $$\phi_{ij,kl}=\arg\{e^{i(\theta_i-\theta_j-\theta_k+\theta_l)}\int d\vec{\kappa}|\hat{S}|^2|\hat{D}|^2 U_{ij}U_{kl}\}. \quad (36)$$

Because the function $U_{ij}$ and $U_{kl}$ are real, the value of $\phi_{ij,kl}$ is simply $$\phi_{ij,kl}=\theta_i-\theta_j-\theta_k+\theta_l. \quad (37)$$

This is the desired result, and indicates that the impact of segment tilt errors upon piston sensing has been eliminated.

The Invention's Optical Implementation

Figure 4:
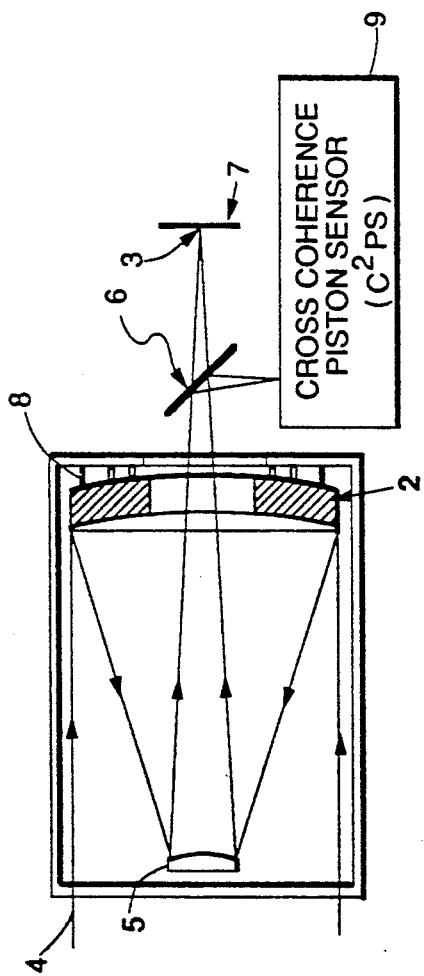
FIG. 4 is a sectional view of a generic segmented optical system to be controlled in piston and tilt.

FIG. 4 depicts a generic optical system consisting of a segmented primary mirror 2. The segments must be controlled by piston and tilt actuators 8 in order to provide a full aperture diffraction limited image 3. After light from the scene 4 reflects from the segmented primary mirror 2 to the secondary mirror 5, the light is reflected to a beam splitter 6.

The beamsplitter 6 splits the optical beam into two portions. One portion is detected by detectors 7 in the full aperture focal plane of the optical system. The second portion of the beam is sent into the cross-coherence piston sensor 9.

The beamsplitter's transmission to reflection ratio is optimized by balancing the signal to noise ratio requirements of both the cross-coherence piston sensor and the full aperture image.

(The term optical as used in the preceding and following paragraphs, is not limited to visible or infrared wavelengths, but rather is applied to any incoherent source).

A candidate optical block diagram of the physical implementation of the cross-coherence piston sensor ($C^2PS$) is depicted in FIG. 1. The $C^2PS$ is designed such that its entrance pupil 10 is conjugate to the segmented primary mirror. The segmented aperture geometry illustrated at the entrance pupil of the $C^2PS$ corresponds to eight active segments, and a central obscuration. (The eight segment geometry is depicted for illustration purposes. The $C^2PS$ sensing technique is not limited to this number of segments). Radiation enters the $C^2PS$ and is split into three separate beams by beamsplitters BS1 and BS2.

The first beamsplitter BS1 diverts part of the beam out of the main beam path to an array of lenslets L3 that are conjugate to the optical systems segmented primary mirror. The lenslet array's (L3) geometry corresponds to subapertures that map onto individual segments of the primary mirror. The lenslet array geometry for L3 is depicted in LG3. The individual and distinct images formed by the individual lenslet elements of L3 are detected by focal plane detector arrays FPA3 (or a single focal plane array depending upon other system considerations).

The remainder of the beam from beamsplitter BS1 is sent to beamsplitter BS2. Beamsplitter BS2 sends parts of the beam to lenslet arrays L1 and L2. Lenslet arrays L1 and L2 correspond to subapertures that map onto contiguous segment pairs (referred to as bisegments) of the primary mirror.

The lenslet array geometries of L1 and L2 are depicted in LG1 and LG2, respectively. The images formed by the elements of the lenslet arrays L1 and L2 are referred to as bisegment images. The four bisegment images formed from lenslet array L1 are detected by focal plane arrays FPA1, and the four bisegment images formed from lenslet array L2, which are distinct from the four images formed from lenslet array L2, are detected by focal plane detector arrays FPA2. (The eight distinct bisegment images provide a sufficient number of measurements for the determination of the piston error estimates as described in the previous sections).

The intensity ratios of all beamsplitters are selected such that the performance of the total optical system is optimized. The outputs of the detector arrays are fed to a computer 14, which processes them by a special technique described previously to determine the piston and tilt errors for the mirror segments. The magnitude of piston and tilt errors for each segment are relative quantities. Accordingly, an arbitrary mirror segment may be taken as a reference, and the piston and tilt errors for the other segments calculated based upon misalignments between those segments and the reference segment, or an optimal reconstruction can be performed referenced to a calculated reference plane.

After the relative piston errors have been calculated by computer 14, error correction signals 15 are generated and fed back to the piston and tilt actuators.

The net result of the optical system illustrated in FIG. 1 is that electrical signals are produced by the various focal plane arrays which correspond to each bisegment image, and to each individual segment image. Other physical arrangements could be envisioned to achieve the same end. For example, a separate beam splitter could be provided for each different bisegment, with a mask placed in the path of the diverted beam so that only the selected bisegment is transmitted to a corresponding optical sensor. However, this would unduly increase the number of separate beam splitters and focal plane arrays, and the large number of diversions would also make it difficult to maintain control over the beam intensity at all points of the system.

Figure 5:
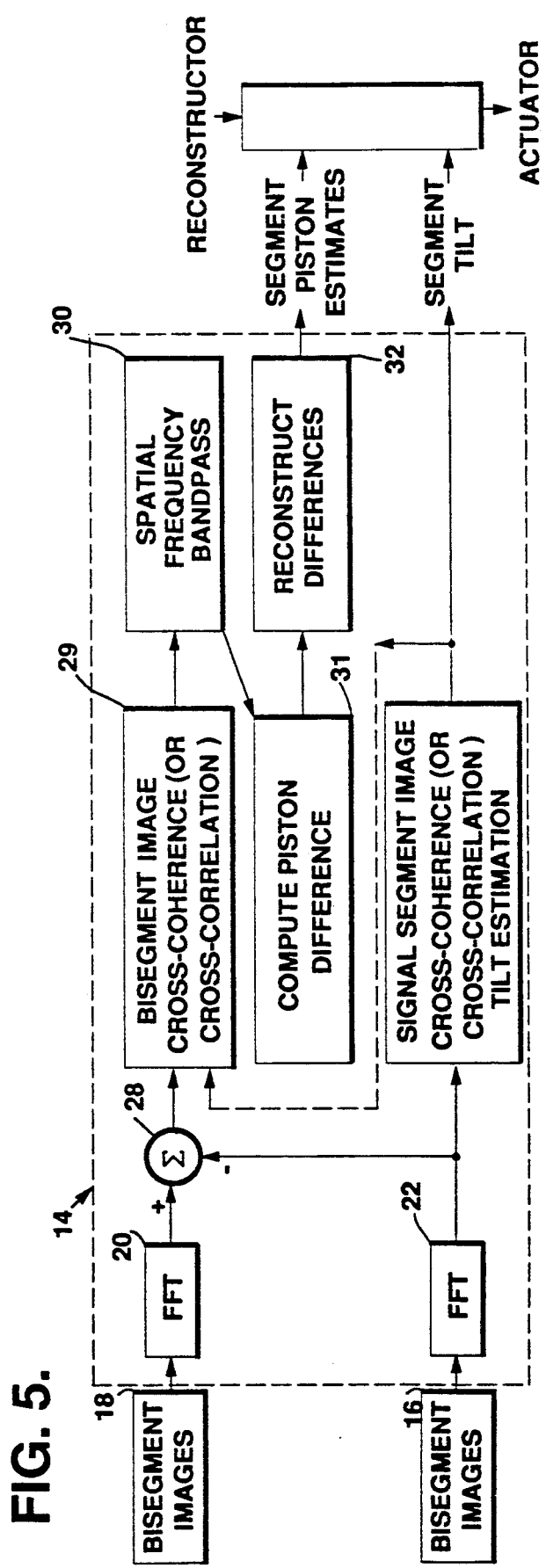
FIG. 5 is a block diagram of the present cross-coherence piston sensing technique.

A potential realization of the algorithm employed by the invention to obtain the piston and tilt errors is illustrated in the block diagram of FIG. 5. The computations which take place within computer 14 are enclosed within a dashed line. Electrical signals from the focal plane arrays of FIG. 4, which represent both the bisegment images 18, and the individual segment images 16, are supplied as computer inputs. The computer is programmed to perform a Fourier transforms (blocks 20, 22) to convert the incoming spatial signals to the spatial frequency domain. The Fourier transforms of the individual segment images are then subtracted from those of the bisegment images (block 28). Since piston error is a measure of relative misalignment between different mirror segments, rather than an absolute value associated with each individual segment, the signals from the bisegment images will contain useful piston error information, whereas the signals from the individual segment images will not. By operating in the spatial frequency domain to subtract the individual segments from the bisegments in which they are contained, the output from block 28 will be a set of spatial frequency domain arrays associated with each of the bisegment images, without the spatial frequency domain information associated with the single segment images.

The output from block 28 is then used to form the cross-coherence spatial frequency bandpassed functions of equation (12) from the previous section, and are used to compute the difference of piston differences as described by equation (13) of the previous section. This entire process is characterized by blocks 29 through 32. The tilt estimates may also be performed by a cross-coherence technique as discussed in a previous section and depicted by block 33.

The dotted line going from the output of block 33 represents segment tilt estimates feeding into block 29 and depicts the additional (and optional, depending upon system requirements) use of tilt estimates to enhance the piston error estimation accuracy as indicated in the previous section by equations (34) through (37). The bisegment piston differences are then processed through a conventional reconstruction matrix (block 32), preferably one which operates by the standard least squares technique (sometimes called the optimal estimation technique), to obtain the relative piston adjustments associated with the different individual segments. These piston adjustments are fed into the piston actuators, which correct the appropriate segments accordingly to reduce, and ideally totally eliminate, the piston errors.

The piston error correction technique of the present invention is preferably used in connection with a segmented mirror piston and tilt correction scheme to produce a segmented mirror surface which approximates a smooth curve as closely as possible. While particular embodiments of the invention have been shown and described, it should be understood that numerous variations and alternate embodiments will occur to those skilled in the art. Accordingly, it is intended that the invention be limited only in terms of the appended claims.

We claim:

1. A method of estimating and reducing relative piston misalignments between segments of a multisegment optical system, comprising:

processing optical beams from said optical system, said beams bearing images that are subject to distortion by piston errors among said optical elements, obtaining spatial frequency domain representations of the processed beams which correspond to pairwise combinations of said segments, removing from said spatial frequency domain representations of said processed beams a spatial frequency domain representation of said image corresponding to selected single segments, to obtain spatial frequency domain representations for each combination which bears information on said relative piston misalignments, comparing said spatial frequency domain representations for the different combinations of segments to obtain relative piston difference of differences between said combinations, operating upon said relative piston difference of differences between said combinations to obtain relative piston misalignments between individual segments, and adjusting the segments of the said optical system's segmented elements in accordance with said relative piston misalignments between individual segments to reduce said misalignments.

2. The method of claim 1, wherein the number of different combinations is at least as great as the number of individual segments.

3. The method of claim 2, wherein the spatial frequency domain representation of said image corresponding to selected single segments is removed from the spatial frequency domain representations of said processed beam by subtracting from the spatial frequency domain representation for each pairwise combination of segments the spatial frequency domain representation of each selected individual segment within said combination.

4. The method of claim 1, wherein said comparison is performed by cross-coherence or cross-correlation processing said spatial frequency domain representations.

5. The method of claim 4, each of said piston error spatial frequency domain representations being characterized by respective allowable spatial frequency ranges, wherein said cross-coherences are performed substantially only for spatial frequencies within said allowable ranges.

6. The method of claim 1, wherein said piston difference of differences misalignment information is operated upon by a least squares reconstruction matrix to obtain said relative piston misalignments between individual segments.

7. A method of reducing relative piston misalignments between segments of a multisegment optical systems, comprising:

processing optical beams with said optical system, obtaining spatial frequency domain representations of the processed optical beams corresponding to both individual segments of said segmented optical element and to pairwise combinations of said segments, subtracting the spatial frequency domain representations of said individual segments from the spatial frequency domain representations of said pairwise combinations of segments to obtain spatial frequency domain functions for said combinations of segments, comparing said spatial frequency domain functions to obtain differences of piston differences misalignment information between said combinations of segments, operating upon said difference of piston differences misalignment information between said combinations of segments to obtain relative piston misalignments between individual segments, and adjusting the segments of said segmented optical element in accordance with said relative piston misalignments between individual segments to reduce said misalignments.

8. The method of claim 7, said combinations of segments comprising two segments each, with each individual segment appearing in two of said combinations.

9. The method of claim 7, wherein said comparison is performed by cross-coherence processing said spatial frequency domain functions.

10. The method of claim 9, each of said spatial frequency domain functions being characterized by respective allowable spatial frequency ranges, wherein said cross-coherences are performed substantially only for spatial frequencies within said allowable ranges.

11. The method of claim 7, wherein said relative piston misalignment information is operated upon by a least squares reconstruction matrix to obtain said relative piston misalignments between individual segments.

12. The method of claim 7, wherein selected portions of said beam which correspond to said combinations of segments and to said individual segments are imaged onto focal plane arrays, and said spatial frequency domain representations are obtained from said focal plane arrays.

13. A method of reducing relative piston misalignments between individual segments of a segmented mirror, comprising:

reflecting an optical beam off said segmented mirror, said beam bearing an image which is subject to distortion by piston errors among said segments, obtaining spatial frequency domain representations of portions of the reflected beam reflected from both individual mirror segments and from multiple combinations of said segments, subtracting from the spatial frequency domain representations of said combinations of segments the spatial frequency domain representations of said individual segments included within said combinations to obtain spatial frequency domain functions for said combinations of segments, cross-coherence processing said piston error spatial frequency domain functions to obtain difference of piston differences misalignment information between said combinations of segments, operating upon said difference of piston differences misalignment information with a reconstruction matrix to obtain relative piston misalignments between individual segments, and adjusting said segments in accordance with said relative piston misalignments between individual segments to reduce said misalignments.

14. The method of claim 13, said combinations of segments comprising two segments each, with each individual segment appearing in two of said combinations.

15. The method of claim 13, each of said piston error frequency domain functions being characterized by respective allowable spatial frequency ranges, wherein said cross-coherence processing is performed substantially only for spatial frequencies within said allowable ranges.

16. The method of claim 13, wherein said relative piston misalignment information is operated upon by a least squares reconstruction matrix to obtain said relative piston misalignments between individual segments.

17. The method of claim 13, wherein selected portions of said beam which correspond to said combinations of segments and to said individual segments are imaged onto focal plane arrays, and said spatial frequency domain representations are obtained from said focal plane arrays.

18. A method of estimating and reducing relative piston misalignments between segments of a multisegment optical system, comprising:

processing optical beams from said optical system, said beams bearing images that are subject to distortion by piston and tilt errors among said optical elements, obtaining spatial frequency domain representations of the processed beams which correspond to pairwise combinations of said segments, removing from said spatial frequency domain representations of said processed beams a spatial frequency domain representation of said image corresponding to selected single segments, to obtain spatial frequency domain representations for each combination which bears information on said relative piston misalignments, comparing said spatial frequency domain representations for the different combinations of segments and using tilt error estimates to obtain relative piston difference of differences between said combinations, operating upon said tilt error estimates and said relative piston difference of differences between said combinations to obtain relative piston misalignments between individual segments, and adjusting the segments of the said optical system's segmented elements in accordance with said relative piston misalignments between individual segments to reduce said misalignments.

19. The method of claim 18, wherein the number of different combinations is at least as great as the number of individual segments.

20. The method of claim 19, wherein the spatial frequency domain representation of said image corresponding to selected single segments is removed from the spatial frequency domain representations of said processed beam by subtracting from the spatial frequency domain representation for each pairwise combination of segments the spatial frequency domain representation of each selected individual segment within said combination.

21. The method of claim 18, wherein said comparison is performed by cross-coherence or cross-correlation processing said spatial frequency domain representations.

22. The method of claim 21, each of said piston error spatial frequency domain representations being characterized by respective allowable spatial frequency ranges and weighted by the appropriately selected tilt error estimates, wherein said cross-coherences are performed substantially only for spatial frequencies within said allowable ranges.

23. The method of claim 18, wherein said piston difference of differences misalignment information is operated upon by a least squares reconstruction matrix to obtain said relative piston misalignments between individual segments.

24. A method of reducing relative piston misalignments between segments of a multisegment optical systems, comprising:

processing optical beams with said optical system, obtaining spatial frequency domain representations of the processed optical beams corresponding to both individual segments of said segmented optical element and to pairwise combinations of said segments, subtracting the spatial frequency domain representations of said individual segments from the spatial frequency domain representations of said pairwise combinations of segments to obtain spatial frequency domain functions weighted by the appropriately selected tilt error estimates for said combinations of segments, comparing said weighted spatial frequency domain functions to obtain differences of piston differences misalignment information between said combinations of segments, operating upon said difference of piston differences misalignment information between said combinations of segments to obtain relative piston misalignments between individual segments, and adjusting the segments of said segmented optical element in accordance with said relative piston misalignments between individual segments to reduce said misalignments.

25. The method of claim 24, said combinations of segments comprising two segments each, with each individual segment appearing in two of said combinations.

26. The method of claim 24, wherein said comparison is performed by cross-coherence processing said weighted spatial frequency domain functions.

27. The method of claim 26, each of said weighted spatial frequency domain functions being characterized by respective allowable spatial frequency ranges, wherein said cross-coherences are performed substantially only for spatial frequencies within said allowable ranges.

28. The method of claim 24, wherein said relative piston misalignment information is operated upon by a least squares reconstruction matrix to obtain said relative piston misalignments between individual segments.

29. The method of claim 24, wherein selected portions of said beam which correspond to said combinations of segments and to said individual segments are imaged onto focal plane arrays, and said spatial frequency domain representations are obtained from said focal plane arrays.

* * * * *